Patented May 5, 1942

2,281,787

UNITED STATES PATENT OFFICE 2,281,787

COMPOSITION FOR INSECTICIDAL USE

Albert C. Mohr, Berkeley, Calif., assignor to Stauffer Chemical Company, San Francisco, Calif., a corporation of California No Drawing. Application November 16, 1939, Serial No. 304,713

12 Claims. (Cl. 167—22)

This invention relates to certain compounds useful as insecticides, either alone or in combination with other materials, in the control of pests such as citrus thrips.

The control of citrus thrips, for example, has long been a grievous problem to the citrus grower. While it has been known that nicotine was useful against this pest, the cost of treating a citrus grove was so high that the vast majority of growers preferred to take their chances on the ravages of the pest rather than dust the grove with a nicotine carrying material.

The insecticides of the present invention are manufactured by known methods. They can be successfully applied either as a wet spray composition or as a dust. Depending upon the characteristics of the particular compound chosen, a wide range of water solubilities are provided, while other materials are possessed of hygroscopic powers so that, when applied as a dust, the materials tend to remain wet. This is of advantage because the dry material is usually dusted together with a sweetening agent such as sugar and the like to attract the pest. Sugar maintained wet is attractive to the insect pests.

The present invention deals broadly with a class of compounds containing the antimonyl group, the SbO group. In these compounds, organic derivatives of antimony, the antimony, instead of being bonded directly to a carbon atom, is separated therefrom by an oxygen atom. The compounds can be readily prepared, for example, by reacting, under reflux, the desired salt of the hydroxy acid whose antimonyl is to be formed with freshly prepared antimony oxide.

As suitable salts I have successfully employed the lithium, sodium, potassium, ammonium, calcium, barium, strontium, and magnesium salts, as well as these in combination, including sodium calcium, potassium lithium, calcium lithium, calcium potassium, zinc calcium, zinc sodium, as well as metals such as zinc, aluminum, and the like. The double salts usually are low in water solubility and therefore crystallize readily.

The insecticides of the present invention are antimonyls of dibasic acids containing three or more hydroxy groups with at least one hydroxy group in the alpha position with respect to the carboxyl group. Antimonyls of trihydroxyglutaric acid and its various alpha hydroxy containing isomers are useful. The antimonyls of other higher dibasic acids containing at least three hydroxy groups are useful, including saccharic acid, mucic acid, isosaccharic acid and its various isomers, and allomucic and talomucic acids.

In utilizing the compounds of the present invention they can be applied as water solutions, about a pound to four pounds to 100 gallons of water in the spray tank being employed, the composition including a suitable sweetening agent to attract insects to the trees or the vegetation. In the case of moth and like insect treatments the compounds are made up in a concentrated form with a suitable attractant.

When employed as a dust, the dry compounds can be mixed with a suitable inert carrier such as walnut shell flour, peach pit flour, apricot pit flour, wood flour, talc, pumice, bentonite, diatomaceous earth, or an active insecticide such as sulfur, together with a sweetening agent. However, I prefer that the material be added to the dry composition in wet form and permitted to either crystallize out, or else be taken up by the carrier, together with the sweetening agent on the dry carrier, drying the carrier mass if desirable and then milling it to finely divided form. A small amount of a suitable inert conditioning material such as starch, talc, or the like can be added to the mass to keep it in free flowing condition during storage. As a sweetening agent one can employ any one of the suitable sugars of sufficient sweetness such as fructose, invert sugar, sucrose, glucose, or mixtures of these or other materials such as molasses and various sweet carbohydrate syrups, refined and unrefined. Usually the dry dusting materials are made up to contain about five pounds of the antimonyl, five pounds of sweeting agent, and ninety pounds of dry carrier.

I claim:

1. An insecticidal composition containing as an essential ingredient, an antimonyl derivative of a saturated dibasic aliphatic acid containing an alpha hydroxy group and at least two other hydroxy groups.

2. An insecticidal composition containing as an essential ingredient, an antimonyl derivative of a saccharic acid.

3. An insecticidal composition containing as an essential ingredient, an antimonyl derivative of a mucic acid.

4. An insecticidal composition containing as an essential ingredient, an antimonyl derivative of a saturated dibasic aliphatic acid containing an alpha hydroxy group and at least two other hydroxy groups, said derivative containing two different elements as the positive ion portion in addition to the SbO group.

5. An insecticidal composition containing as an essential ingredient, an antimonyl derivative of a saccharic acid, said derivative containing two different elements as the positive ion portion in addition to the SbO group.

6. An insecticidal composition containing as an essential ingredient, an antimonyl derivative of a mucic acid, said derivative containing two different elements as the positive ion portion in addition to the SbO group.

7. An insecticidal composition comprising water, a sugar dissolved therein, and an insecticidally effective concentration of an antimonyl derivative of a saturated dibasic aliphatic acid containing an alpha hydroxy group and at least two other hydroxy groups.

8. An insecticidal composition comprising water, a sugar dissolved therein, and an insecticidally effective concentration of an antimonyl saccharate.

9. An insecticidal composition comprising water, a sugar dissolved therein, and an insecticidally effective concentration of an antimonyl mucictate.

10. An insecticidal composition comprising a free flowing finely divided dry inert dusting carrier containing a sugar and an insecticidally effective concentration of an antimonyl derivative of a saturated dibasic aliphatic acid containing an alpha hydroxy group and at least two other hydroxy groups.

11. An insecticidal composition comprising a free flowing finely divided dry inert dusting carrier containing a sugar and an insecticidally effective concentration of an antimonyl saccharate.

12. An insecticidal composition comprising a free flowing finely divided dry inert dusting carrier containing a sugar and an insecticidally effective concentration of an antimonyl mucictate.

ALBERT C. MOHR.